United States Patent
Takabatake et al.

(10) Patent No.: US 10,489,271 B2
(45) Date of Patent: Nov. 26, 2019

(54) MULTI-PROCESSOR AND MULTI-PROCESSOR SYSTEM FOR CODE DEBUGGING

(71) Applicant: Renesas Electronics Corporation, Tokyo (JP)

(72) Inventors: Motoyasu Takabatake, Tokyo (JP); Hisashi Shiota, Tokyo (JP); Atsushi Nakamura, Tokyo (JP); Yuji Chiba, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 50 days.

(21) Appl. No.: 15/792,480

(22) Filed: Oct. 24, 2017

(65) Prior Publication Data
US 2018/0150386 A1   May 31, 2018

(30) Foreign Application Priority Data
Nov. 28, 2016   (JP) .................................. 2016-230039

(51) Int. Cl.
*G06F 11/36* (2006.01)

(52) U.S. Cl.
CPC ........ *G06F 11/3612* (2013.01); *G06F 11/362* (2013.01)

(58) Field of Classification Search
CPC ............. G06F 11/2236; G06F 11/2242; G06F 11/2736; G06F 11/3648
USPC .......................... 712/227; 714/10–13, 30, 31
See application file for complete search history.

(56) References Cited

U.S. PATENT DOCUMENTS

| | | | | |
|---|---|---|---|---|
| 7,080,283 B1* | 7/2006 | Songer | ................ | G06F 11/3636 714/30 |
| 7,627,784 B1* | 12/2009 | Allen | ................... | G06F 11/3636 714/30 |
| 9,404,970 B2* | 8/2016 | Lin | ..................... | G01R 31/3177 |
| 2005/0262396 A1* | 11/2005 | Woodward | ......... | G01R 31/3177 714/30 |
| 2011/0307741 A1* | 12/2011 | Chen | ................... | G06F 11/3636 714/38.1 |

(Continued)

FOREIGN PATENT DOCUMENTS

| | | |
|---|---|---|
| JP | 2000-076199 A | 3/2000 |
| JP | 2006-302162 A | 11/2006 |

OTHER PUBLICATIONS

Extended European Search Report dated Apr. 6, 2018 in corresponding European Patent Application No. 17195337.5.

*Primary Examiner* — Joseph R Kudirka
(74) *Attorney, Agent, or Firm* — McGinn IP Law Group, PLLC

(57) ABSTRACT

The size of a multi-processor is prevented from increasing even when the number of processor cores is increased. The multi-processor includes a plurality of cores and a debugging control unit. At least one of the plurality of cores is a debugging core, the debugging core being connected to the debugging control unit so that the debugging control unit can refer to and update register information in the debugging core. The debugging control unit transfers register information in a first core to the debugging core, the first core being one of the plurality of cores and being a core to be debugged. The debugging core debugs a program by using the transferred register information, the program being executed in the first core.

20 Claims, 10 Drawing Sheets

(56) References Cited

U.S. PATENT DOCUMENTS

2012/0210103 A1   8/2012   Liao et al.

* cited by examiner

MULTI-PROCESSOR AND MULTI-PROCESSOR SYSTEM FOR CODE DEBUGGING

CROSS-REFERENCE TO RELATED APPLICATIONS

This application is based upon and claims the benefit of priority from Japanese patent application No. 2016-230039, filed on Nov. 28, 2016, the disclosure of which is incorporated herein in its entirety by reference.

BACKGROUND

The present disclosure relates to a multi-processor and a multi-processor system. For example, the present disclosure relates to a multi-processor and a multi-processor system for debugging a program executed by a core processor.

Japanese Unexamined Patent Application Publication No. 2000-76199 discloses a technique related to a multi-processor apparatus including a debugging terminal. The multi-processor apparatus disclosed in Japanese Unexamined Patent Application Publication No. 2000-76199 includes a debugging interface (I/F) for each processor.

Japanese Unexamined Patent Application Publication No. 2006-302162 discloses a technique related to a multi-processor system. The multi-processor system disclosed in Japanese Unexamined Patent Application Publication No. 2006-302162 includes a debugging function unit for each processor and also includes a debugging function unit in a control circuit.

SUMMARY

However, the present inventors have found the following problem. Each of Japanese Unexamined Patent Application Publications No. 2000-76199 and No. 2006-302162 includes a debugging control unit such as a debagging I/F or a debugging function unit in order to directly debug each processor core. Therefore, there is a problem that the size of the processor increases according to the number of processor cores.

Other objects and novel features will be more apparent from the following description in the specification and the accompanying drawings.

According to one embodiment, a debugging control unit included in a multi-processor is configured to transfer register information in a first core to a debugging core, the first core being one of a plurality of cores and being a core to be debugged, the debugging core being connected to the debugging control unit so that the debugging control unit can refer to and update the register information in the debugging core.

According to the above-described aspect, it is possible to prevent the size of the processor from increasing even when the number of processor cores is increased.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Specific embodiments to which the above-described means for solving the program is applied are explained hereinafter in detail with reference to the drawings. The same symbols are assigned to the same components throughout the drawings, and duplicated explanation thereof is omitted as appropriate for clarifying the explanation.

In the following embodiments, when necessary, the present disclosure is explained by using separate sections or separate embodiments. However, those embodiments are not unrelated with each other, unless otherwise specified. That is, they are related in such a manner that one embodiment is a modified example, an application example, a detailed example, or a supplementary example of a part or the whole of another embodiment. Further, in the following embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may be also used.

Further, in the following embodiments, their components (including operation steps and the like) are not necessarily indispensable except for cases where the component is explicitly specified or the component is obviously indispensable based on its principle. Similarly, in the following embodiments, when a shape, a position relation, or the like of a component(s) or the like is mentioned, shapes or the likes that are substantially similar to or resemble that shape are also included in that shape except for cases where it is explicitly specified or they are eliminated based on its principle. This is also true for the above-described number or the like (including numbers, values, quantities, ranges, and the like).

Details of how the inventor has arrived at ideas of the below-shown embodiments are explained hereinafter. As an example of an SoC (System on a Chip) for a vehicle-mounted information system, there is an image recognition process processor for recognizing a person or a vehicle by processing an image supplied from a camera. Such an image recognition process processor is a parallel processing processor including a number of core processors (cores). For debugging a program that runs on a number of cores, it is necessary to simultaneously check the states of a plurality of cores in the middle of execution of the program. Therefore, it is desirable that each core have a debugging function. However, when each core has a debugging function, the circuit size increases. Meanwhile, the size of the processor has a direct relation with the manufacturing cost. Therefore, it is desirable that the size of the processor be as small as possible. Accordingly, the inventor has found the following embodiments.

<First Embodiment>

Figure 1:
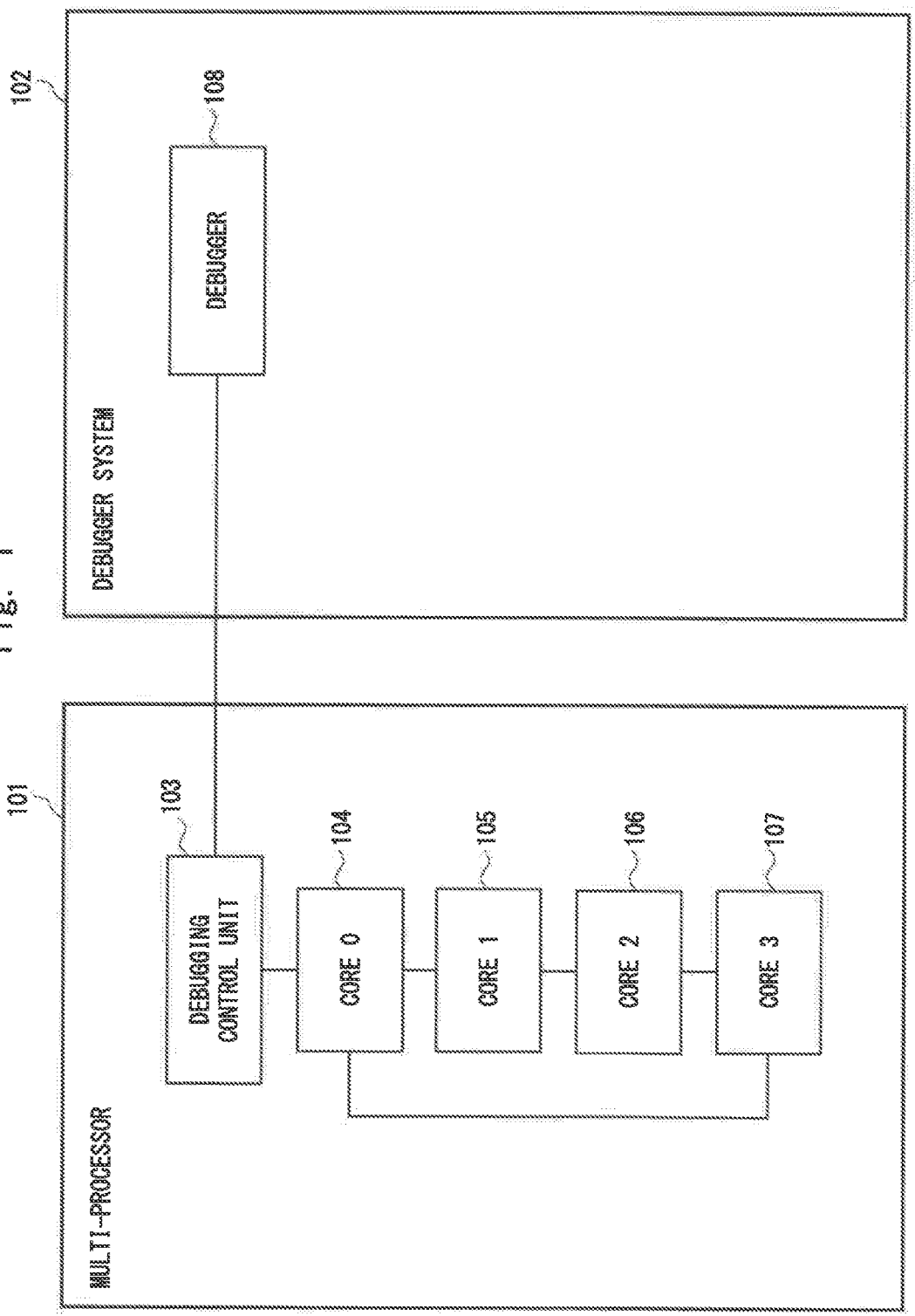
FIG. 1 is a block diagram showing a configuration a multi-processor and a debugger system according to a first embodiment.

FIG. 1 is a block diagram showing a configuration of a multi-processor 101 and a debugger system 102 according to a first embodiment. The debugger system 102 is connected to the multi-processor 101 and debugs a program running on the multi-processor 101. The debugger system 102 is, for example, an information processing system such as a computer and includes a debugger 108. The debugger 108, which is a debugging program that runs on the debugger system 102, receives an instruction from a user, provides an instruction related to debugging to the multi-processor 101, and outputs a result of the debugging and the like.

The multi-processor 101 includes a debugging control unit 103, and cores 0_104, 1_105, 2_106 and 3_107. Note that the number of cores is not necessarily four. That is, the number of cores should be at least two. The debugging control unit 103 is connected to the core 0_104, which is a core for debugging (hereinafter called a debugging core), so that the debugging control unit 103 can refer to and update register information in the core 0_104. The debugging control unit 103 controls the core 0_104 in order to debug a program that runs in the core 0_104. The debugging control unit 103 transfers register information in a first core, which is one of a plurality of cores and is a core to be debugged, to the debugging core.

Each of the cores 0_104 to 3_107 stores register information in its internal register, a program counter, a status register, or the like. The register information is called core unique data. The cores 0_104 to 3_107 are connected in a ring configuration through a ring bus.

Figure 2:
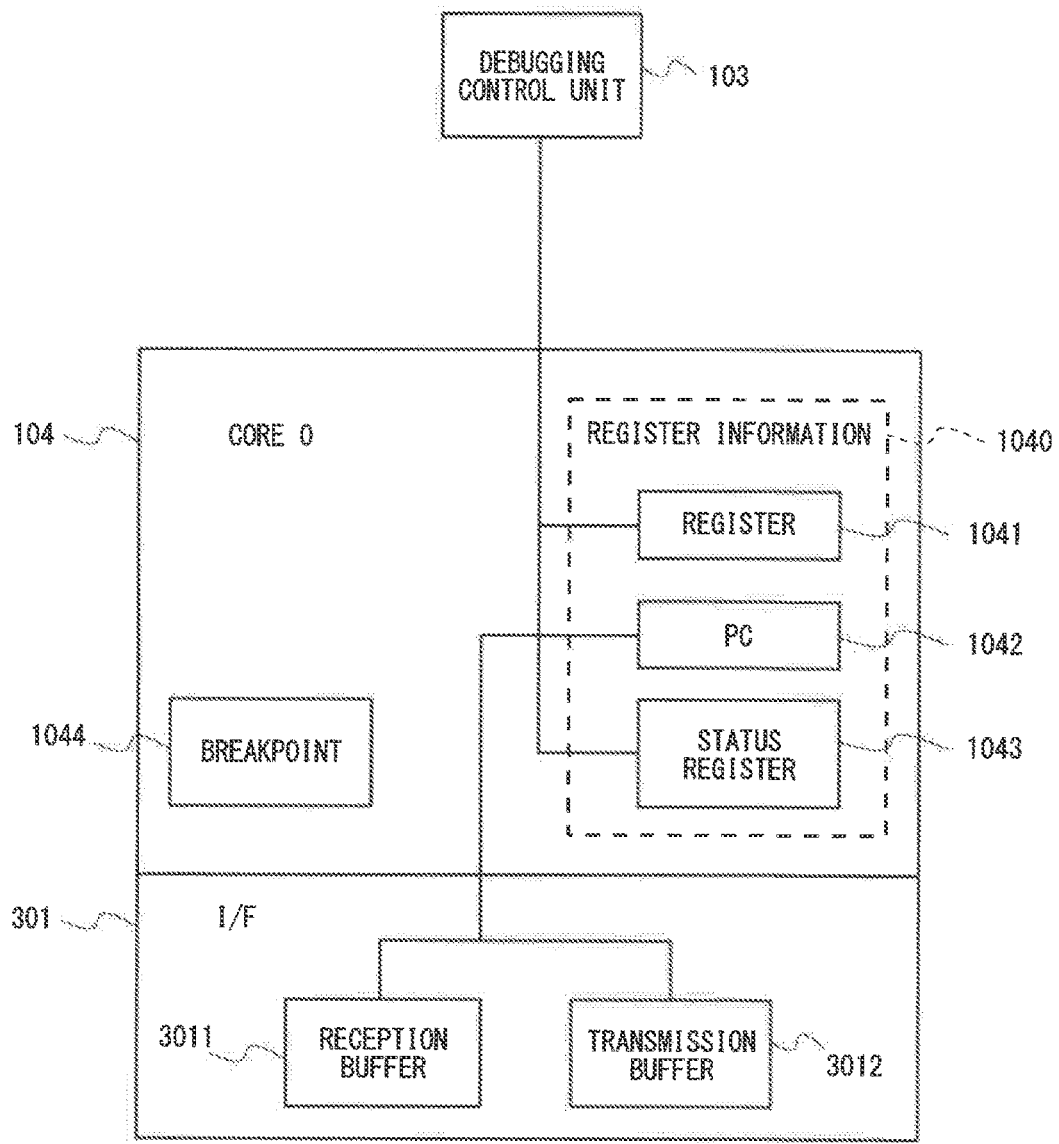
FIG. 2 is a block diagram showing an internal configuration of a core of the multi-processor according to the first embodiment.

FIG. 2 is a block diagram showing an internal configuration of the core 0_104 of the multi-processor 101 according to the first embodiment. The core 0_104 includes register information 1040, a breakpoint 1044, and an I/F 0_301. As described above, the register information 1040 is values stored in the register 1041, the program counter (PC) 1042, the status register 1043, and the like. Further, the debugging control unit 103 is connected to the core 0_104 so that it can refer to and update values in the register 1041, the PC 1042, and the status register 1043, The breakpoint 1044 is an area in which an instruction address which is set before starting debugging and at which a program is stopped at some midpoint is stored. The I/F 0_301 includes a reception buffer 3011 and a transmission buffer 3012. The reception buffer 3011 is a storage area for receiving unique data transferred from a core adjacent to the core 0_104 (e.g., the core 3_107) and temporarily storing the received unique data. The transmission buffer 3012 is a storage area for temporarily storing unique data of the core 0_104, i.e., the register information 1040 in order to transfer it to a core adjacent to the core 0_104 (e.g., the core 1_105). That is, when the core 0_104 transfers the register information 1040, it stores register information 1040, which is originally stored in the register 1041, the PC 1042, and the status register 1043, into the transmission buffer 3012. Further, the core 0_104 overwrites the register 1041, the PC 1042, and the status register 1043 with the register information stored in the reception buffer 3011.

Note that the internal configuration of each of the cores 1_105, 2_106 and 3_107 is similar to the configuration shown in FIG. 2, except that the core is not connected to the debugging control unit 103 so that it can refer to and update the register information in the core. Therefore, they are neither graphically shown in the drawings nor explained in the specification.

Figure 3:
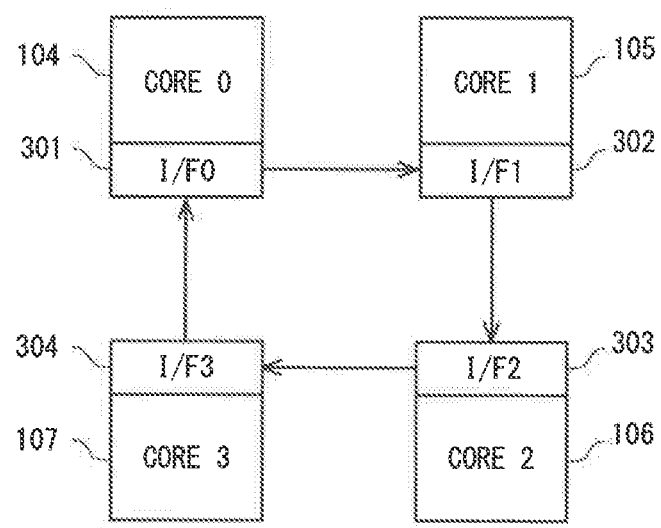
FIG. 3 is a block diagram showing a configuration of a ring bus among cores of the multi-processor according to the first embodiment.

FIG. 3 is a block diagram showing a configuration of a ring bus connecting the cores of the multi-processor 101 according to the first embodiment. The cores 0_104, 1_105, 2_106 and 3_107 include I/Fs 0_301, 1_302, 2_303 and 3_304, respectively, which are interfaces with the bus. Specifically, the I/F 0_301 is connected to the I/Fs 1_302 and 3_304, and the I/F 1_302 is connected to the I/Fs 0_301 and 2_303. Further, the I/F 2_303 is connected to the I/Fs 1_302 and 3_304, and the I/F 3_304 is connected to the I/Fs 0_301 and 2_303. That is, each core is connected to its neighboring cores by the bus I/Fs in a ring configuration. Further, unique data of each core is transferred in a direction indicated by arrows in FIG. 3. Note that the direction indicated by the arrows is merely an example and it may be the opposite direction. Further, the connection order of cores is also not limited to this example.

When each core receives an instruction for replacing unique data of the core from the debugging control unit 103, the core transfers its own unique data to one of the neighboring cores in a predetermined order. Specifically, the unique data of the core 0_104 is transferred to the reception buffer of the I/F 1_302 through the transmission buffer of the I/F 0_301. Further, the unique data of the core 1_105 is transferred to the reception buffer of the I/F 2_303 through the transmission buffer of the I/F 1_302. Further, the unique data of the core 2_106 is transferred to the reception buffer of the I/F 3_304 through the transmission buffer of the I/F 2_303. Further, the unique data of the core 3_107 is transferred to the reception buffer of the I/F 0_301 through the transmission buffer of the I/F 3_304. Further, each core stores the unique data stored in the reception buffer of its I/F into its internal register.

Figure 4:
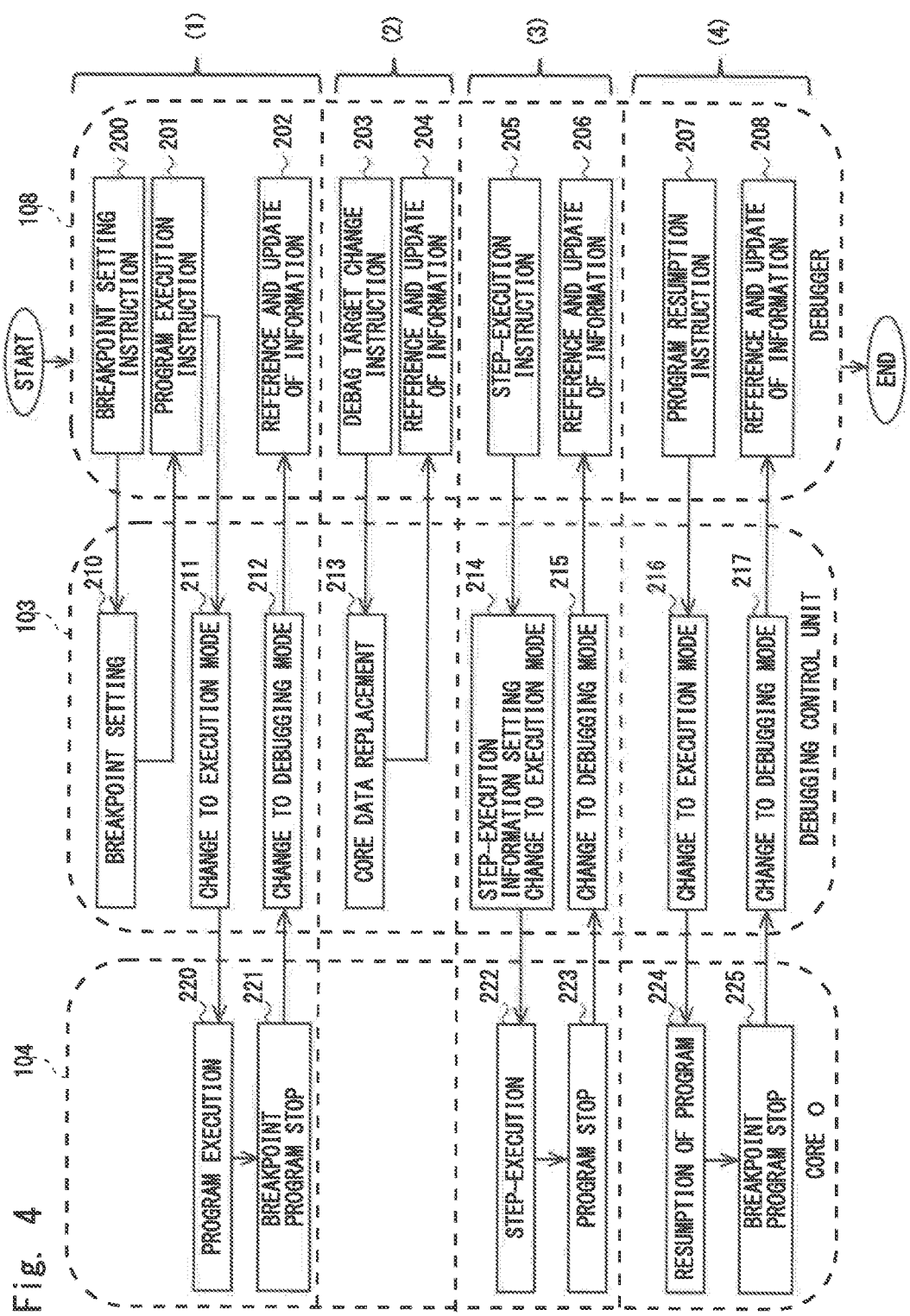
FIG. 4 is a flowchart showing a flow of a debugging process according to the first embodiment.

FIG. 4 is a flowchart showing a flow of a debugging process according to the first embodiment. In FIG. 4, various events are connected by arrows, indicating that events occur in a chronological order according to the directions of the arrows. Note that in FIG. 4, individual events are divided into events for the debugger 108, events for the debugging control unit 103, and events for the core 0_104 according to the place where the event occurs.

Modes are defined for program execution states which a program can assume during debugging. In particular, the modes include an execution mode in which the program is being executed and a debugging mode in which debugging is being carried out. In the example shown in FIG. 4, a mode in which the flow is started from the debugger 108 is the debugging mode.

Further, in general, tasks performed during debugging include (1) setting of a breakpoint, (2) a change of a core to be debugged, (3) step-execution, and (4) a resumption of a program. Further, information in the core is referred to and updated (i.e., read and written) in each of the tasks (1) to (4).

Note that (2) the change of the core to be debugged means that the core that is operated by the debugger 108 is changed to a core designated by an operator of debugging (hereinafter called a "debugging operator"). When debugging is performed, firstly, this change of the core is performed. That is, the core in which a part of a program to be debugged is running is determined. After that, the determined core is made to perform a step-execution process, and/or a breakpoint is set and the execution of the program by the core is advanced to the breakpoint. FIG. 4 shows an example of the flow.

(1) Setting of Breakpoint

When a program is to be stopped at a certain instruction address, a breakpoint is set in each core. Specifically, firstly, the debugger 108 receives designation of an instruction address in a program from a debugging operator and outputs an instruction for setting the received instruction address as a breakpoint (hereinafter called a "breakpoint setting instruction") to the debugging control unit 103 (200). The debugging control unit 103 writes the instruction address in the breakpoint 1044 of each core in response to the breakpoint setting instruction (210).

After that, the debugger 108 outputs an instruction for executing the program (hereinafter called a "program execution instruction") to the debugging control unit 103 in response to an instruction from the debugging operator (201). The debugging control unit 103 changes the mode to an execution mode (211) and makes the core 0_104 execute the program (220). Note that the program is also executed in parallel in the other cores 1_105 to 3_107.

When the program running on the core 0_104 reaches the instruction address at the breakpoint, the core 0_104 stops its operation (221) and notifies the debugging control unit 103 of the stop. Upon being notified of the stop, the debugging control unit 103 changes the mode to a debugging mode (212), stops all the cores, and notifies the debugger 108 of the stops.

Upon being notified of the stops, the debugger 108 refers to and updates the register information in the stopped core 0_104 through the debugging control unit 103 (202).

(2) Change of Core to be Debugged

When the core to be debugged is changed from the core 0_104 to another core, the unique data of the core to be debugged is transferred to the core 0_104. By doing so, it becomes possible to debug a part of a program running on the core that is not connected to the debugging control unit 103.

Specifically, the debugger 108 outputs an instruction for changing the core to be debugged (hereinafter called a "debugging target change instruction") to the debugging control unit 103 in response to an instruction from the debugging operator (203). Upon receiving this instruction, the debugging control unit 103 replaces data of cores (213). Note that details of the method for replacing core data are explained later. As a result of this replacement, the debugger 108 refers to and updates the register information in the stopped core 0_104 through the debugging control unit 103 (204). At this point, the register information in the core 0_104 has been already replaced by the register information of the core to be debugged.

(3) Step-execution

When step-execution is performed, the debugger 108 outputs an instruction for the step-execution (hereinafter called a "step-execution instruction") to the debugging control unit 103 in response to an instruction form the debugging operator (205). Upon receiving this instruction, the debugging control unit 103 sets the number of steps by which the step-execution is performed and changes the mode to an execution mode (214). The core 0_104 executes the program by the number of steps set in the step 214 (222).

After that, the core 0_104 stops its operation (223) and notifies the debugging control unit 103 of the stop.

Upon being notified of the stop, the debugging control unit 103 changes the mode to a debugging mode (215) and notifies the debugger 108 of the mode change to the debugging mode. Upon being notified of the mode change, the debugger 108 refers to and updates the register information in the core 0_104, which has finished the step-execution, through the debugging control unit 103 (206).

(4) Resumption of Program

When the program is resumed, the debugger 108 outputs an instruction for resuming the program (hereinafter called a "program resumption instruction") to the debugging control unit 103 in response to an instruction form the debugging operator (207). Upon receiving the instruction, the debugging control unit 103 changes the mode to an execution mode (216) and makes the cores 0_104 to 3_107 resume the execution of the program (224).

When the program running on the core 0_104 reaches the instruction address at the breakpoint, the core 0_104 stops its operation (225) and notifies the debugging control unit 103 of the stop. Upon being notified of the stop, the debugging control unit 103 changes the mode to a debugging mode (217), stops all the cores, and notifies the debugger 108 of the stops.

Upon being notified of the stops, the debugger 108 refers to and updates the register information in the core 0_104 through the debugging control unit 103 (208). Note that when the program has not reached the breakpoint yet in the step 225, the cores 0_104 to 3_107 continue the operation until the execution of the program is finished. By repeating the above-described process, the process for transferring the unique data of the core to be debugged to the core 0_104 is carried out.

Figure 5:
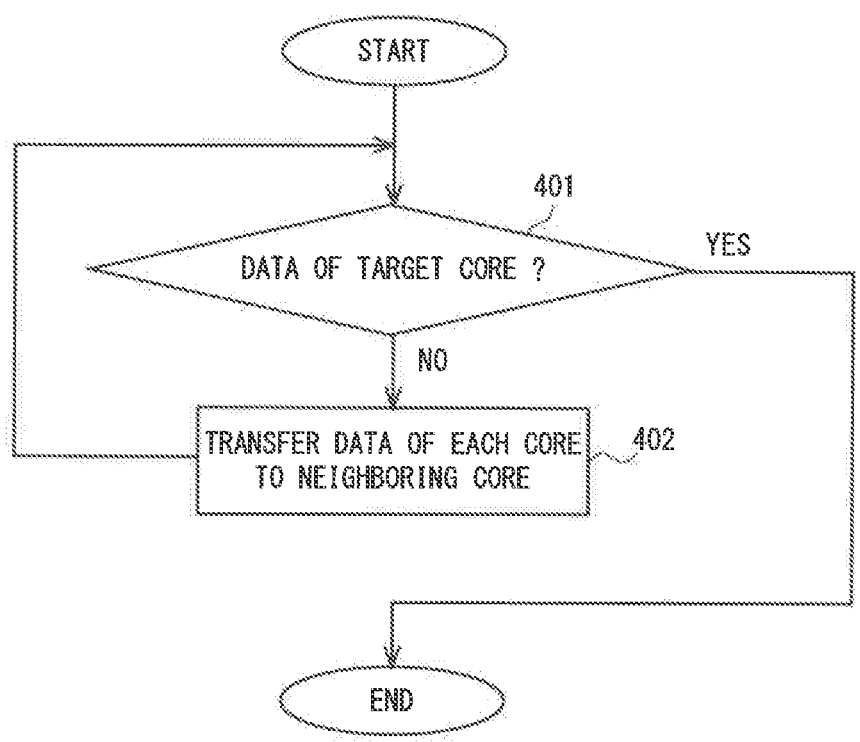
FIG. 5 is a flowchart showing a flow of a process for replacing data in a core of the multi-processor according to the first embodiment.

FIG. 5 is a flowchart showing a flow of a process for replacing data in a core of the processor according to the first embodiment. The process in FIG. 5 corresponds to the core data replacement process in the step 213 in FIG. 4. Firstly, the debugging control unit 103 refers to the register information 1040 of the core 0_104 and thereby determines whether or not the register information is unique data of the core to be debugged (401). Here, it is assumed that identification information of the original core is included in the register information 1040. Then, when the debugging control unit 103 determines that the register information is not the unique data of the core to be debugged, the core 0_104 instructs each core to transfer its unique data to a neighboring core (402). Then, the process returns to the step 401. In the step 401, when the debugging control unit 103 determines that the register information is the unique data of the core to be debugged, it means that the register information, which the debugging control unit 103 can refer to and update, is the unique data of the core to be debugged. Therefore, the debugging control unit 103 finishes the core data replacement process. That is, unique data is repeatedly transferred to a neighboring core among the cores connected in the ring configuration until the unique data of the core to be debugged is transferred to the core 0_104. That is, the unique data of the core to be debugged is transferred to the core 0_104 in a bucket-brigade manner.

As described above, in this embodiment, the debugging control unit can refer to and update register information stored in one of a plurality of cores, i.e., register information stored in the debugging core. Further, the cores are connected in the ring configuration, so that register information, which is core unique data, can be transferred among the cores. Therefore, even register information in a core which the debugging control unit cannot refer to can be successively transferred to the debugging core. By doing so, it is possible to substantially carry out, in the debugging core, debugging of a part of a program that runs on the core to be debugged. Further, since only one debugging control unit is required, it is possible to reduce the size of the processor even when the processor includes a number of cores.

Note that this embodiment can also be expressed as follows. That is, a multi-processor includes a plurality of cores and a debugging control unit. At least one of the plurality of cores is a debugging core, the debugging core being connected to the debugging control unit so that the debugging control unit can refer to and update register information in the debugging core. The debugging control unit transfers register information in a first core to the debugging core, the first core being one of the plurality of cores and being a core to be debugged. In this way, it is possible to prevent or reduce an increase in the size of the processor even when the number of processor cores is increased.

Further, the debugging core debugs a program to be executed in the first core by using the transferred register information. In this way, it is possible to substantially perform debugging in the first core.

The plurality of cores are connected in a ring configuration. When register information in the debugging core is not that of the first core to be debugged, the debugging control unit transfers the register information to a core adjacent to the debugging core. In this way, even for register information that the debugging control unit cannot directly refer to and update, the debugging control unit can refer to and update the register information through the debugging core.

<Second Embodiment>

A second embodiment is a modified example of the above-described first embodiment. A multi-processor according to the second embodiment further includes a save area. The debugging control unit transfers register information in the first core to the debugging core after transferring register information in the debugging core to the save area. In this way, compared to the first embodiment, it is possible to make the data replacement process time uniform and thereby to increase the average speed of debugging operations.

Figure 6:
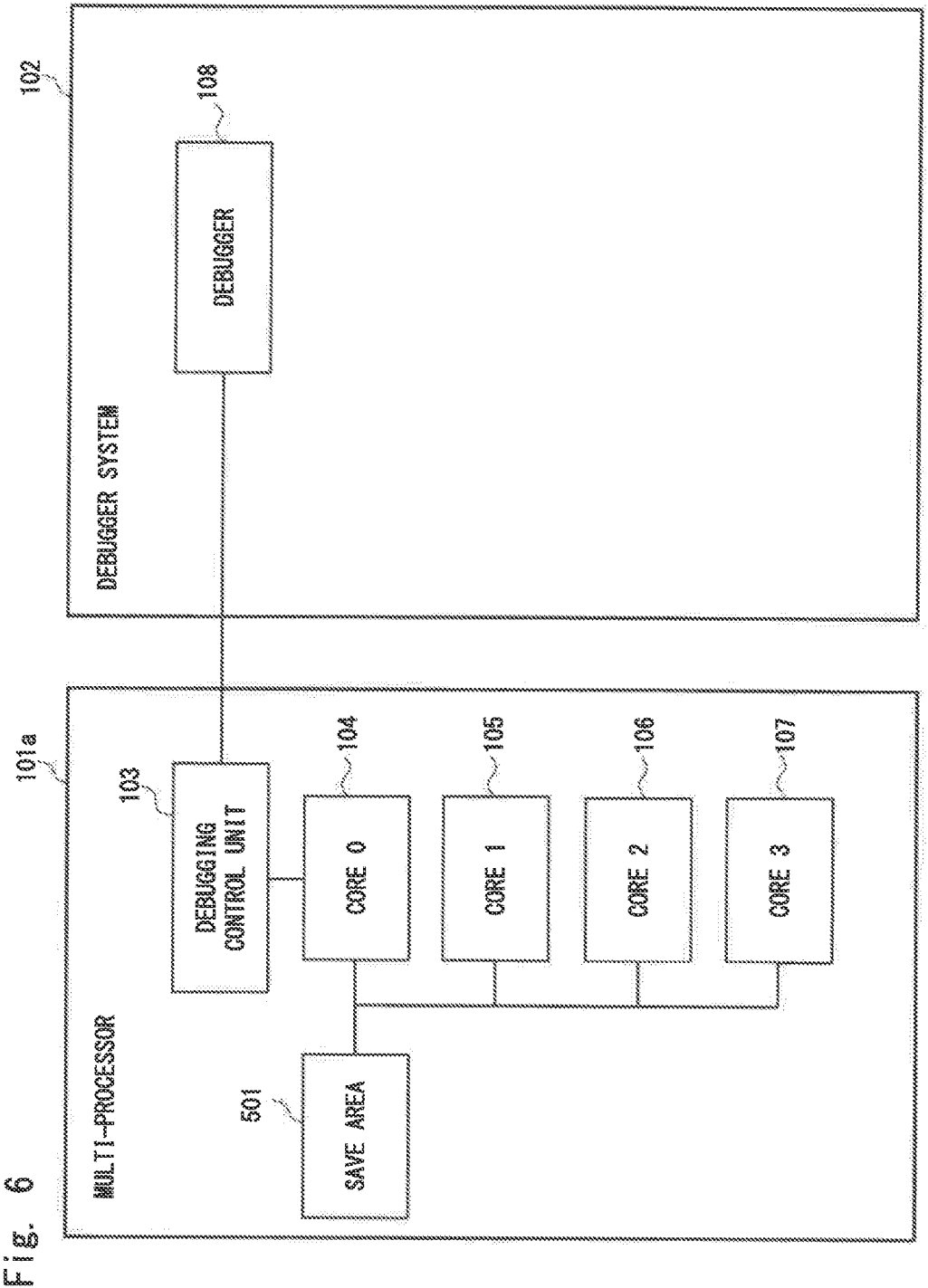
FIG. 6 is a block diagram showing a configuration of a multi-processor and a debugger system according to a second embodiment.

FIG. 6 is a block diagram showing a configuration of a multi-processor 101a and a debugger system 102 according to the second embodiment. The multi-processor 101a includes a debugging control unit 103, cores 0_104, 1_105, 2_106 and 3_107, and a save area 501. The save area 501 is a storage area in which register information, which is core unique data, can be stored. Note that each of the cores 0_104 to 3_107 is connected to the save area 501 through a bus. That is, core unique data can be transferred between arbitrary cores and core unique data can be also transferred between an arbitrary core and the save area 501.

Figure 7:
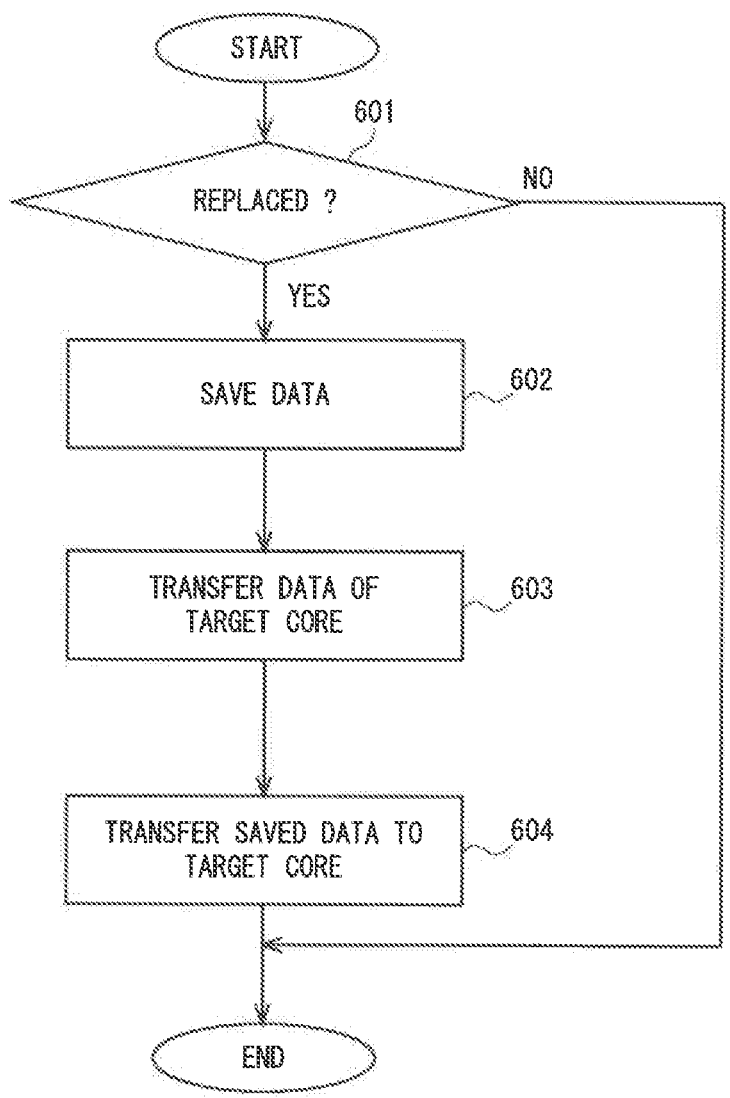
FIG. 7 is a flowchart showing a flow of a process for replacing data in a core of the multi-processor according to the second embodiment.

Note that the debugging process flow is roughly similar to the flow in the first embodiment shown in FIG. 4, except for the core data replacement process in the step 213. FIG. 7 is a flowchart showing a flow of a process for replacing data in a core of the processor according to the second embodiment. FIG. 7 shows a procedure for exchanging unique data between the core 0_104 and the core to be debugged by using the save area 501.

Firstly, the debugging control unit 103 determines whether or not register information of the core 0_104 connected to the debugging control unit 103 is unique data of the core to be debugged and thereby determines whether or not to replace the data (601). When the debugging control unit 103 determines to replace the data, it copies the register information in the core 0_104 to the save area 501 and thereby saves the data (602). Next, the debugging control unit 103 instructs to copy the register information of the core to be debugged to the core 0_104 (603). That is, the debugging control unit 103 transfers the unique data of the core to be debugged to the debugging core. Then, the debugging control unit 103 instructs to copy the data stored in the save area 501 to the core to be debugged (604). That is, the debugging control unit 103 transfers the saved data to the core to be debugged. Note that when the debugging control unit 103 determines that the register information of the core 0_104 is the unique data of the core to be debugged in the step 601, the debugging control unit 103 finishes the data replacement process.

As described above, the second embodiment includes the save area 501, in which the original unique data of the debugging core is saved, and a bus that connects the cores to each other and connects each core to the save area 501. In the previously-described first embodiment, when the number of cores is large and the core to be debugged is located in a place far away from the debugging core, the number of times of data replacement (the number of times of transfers (hereinafter simply referred to as the number of transfers)) increase and hence there is a possibility that the debugging operation is prolonged. In contrast to this, in the second embodiment, the number of data transfers in the data replacement process is three. Therefore, it is possible to make the data replacement process time uniform. As a result, compared to the first embodiment, the average speed of debugging operations can be increased.

<Third Embodiment>

A third embodiment is a modified example of the above-described second embodiment. A debugging control unit according to the third embodiment transfers, when the core to be debugged is changed to a second core among the plurality of cores, register information in the debugging core to the first core and transfers register information in the second core to the debugging core. In this way, compared to the second embodiment, the speed of the core data replacement process can be increased.

Further, when the core to be debugged is changed to the second core, the debugging control unit determines whether or not the register information in the debugging core has been rewritten. Then, when the debugging control unit determines that the register information in the debugging core has been rewritten, it transfers that register information to the first core. In this way, when the register information has not been rewritten, the register information is not transferred. Therefore, the number of transfers can be reduced and the processing speed can be further increased.

Note that the configuration is similar to the configuration in the second embodiment shown in FIG. 6 and the debugging process flow is roughly similar to the flow in the first embodiment shown in FIG. 4. However, the core data replacement process in the step 213 in FIG. 4 and the process for changing to the execution mode in the steps 211 and 216 are different.

In the previously-described second embodiment, when the core to be debugged is changed, three data transfers in the steps 602, 603 and 604 in FIG. 7 are always required. That is, in the second embodiment, data is exchanged between the debugging core, i.e., the core 0_104 and the core to be debugged. In contrast to this, in the third embodiment, it is assumed that the core to be debugged is changed a plurality of times. Unique data of the core 0_104 is first saved in the save area 501 and then unique data of the core to be debugged is transferred to the core 0_104. Then, after the register information of the core 0_104 is read and written, the core unique data, which is this register information, is written back to the original core to be debugged.

Figure 8:
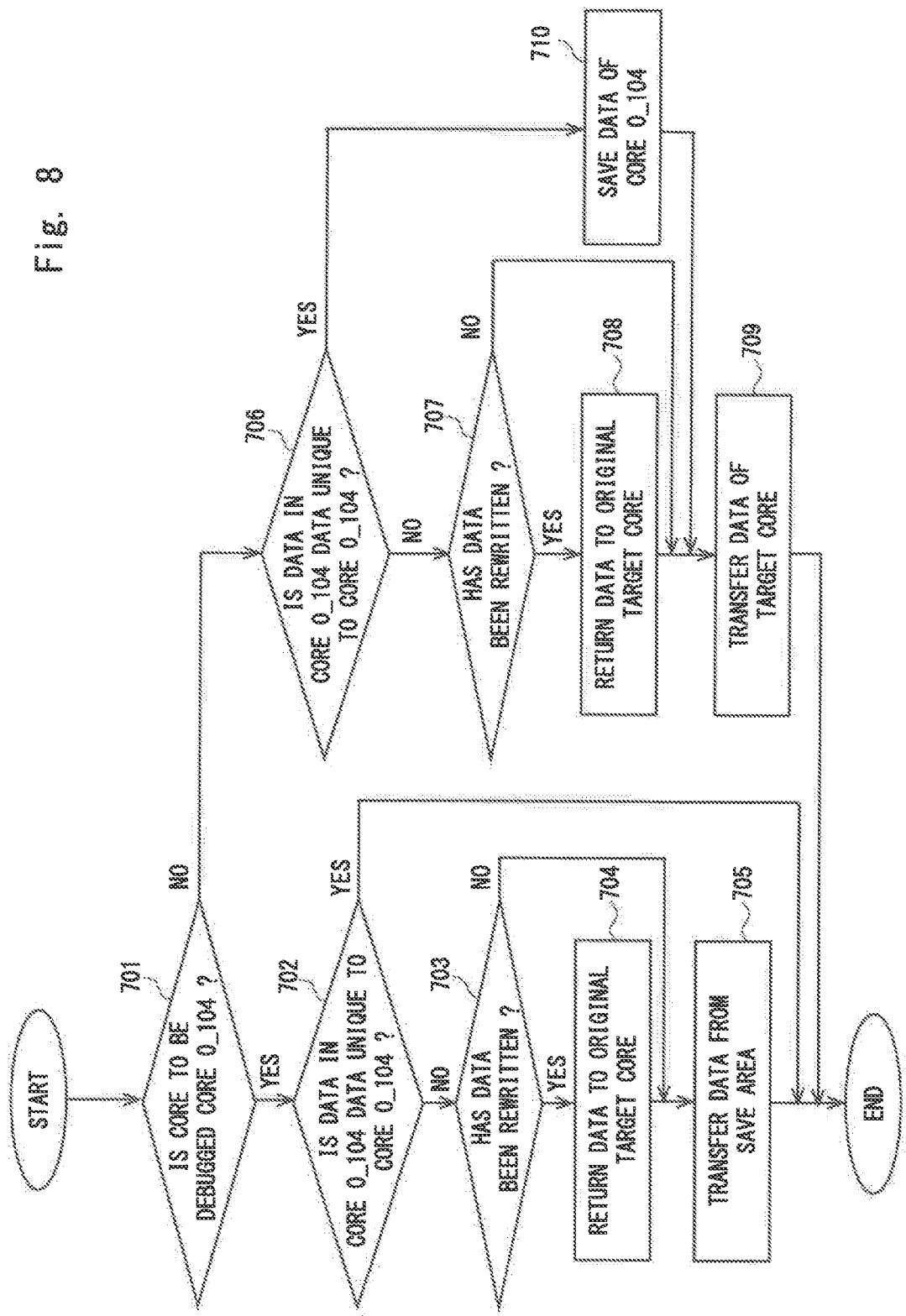
FIG. 8 is a flowchart showing a flow of a process for replacing data in a core of a multi-processor according to a third embodiment.

FIG. 8 is a flowchart showing a flow of a process for replacing data in a core of the multi-processor 101*a* according to the third embodiment. Firstly, the debugging control unit 103 determines whether or not the core to be debugged is the core 0_104 (701). When the core to be debugged is the core 0_104, the process proceeds to a step 702, whereas when the core to be debugged is not the core 0_104, the process proceeds to a step 706.

When the core to be debugged is the core 0_104 in the step 701, the debugging control unit 103 determines whether or not register information in the core 0_104 is unique data of the core 0_104 (702). When the register information in the core 0_104 is the unique data of the core 0_104, the debugging control unit 103 finishes the process. This is because since the register information in the core 0_104 is the unique data of the core 0_104 and hence debugging can be performed by using the unique data of the core 0_104, there is no need to replace the data.

On the other hand, when the register information in the core 0_104 is not the unique data of the core 0_104 in the step 702, the debugging control unit 103 determines whether or not the register information of the core 0_104 has been rewritten by the debugger 108 (703). Note that the debugger 108 rewrites (updates) the register information of the core 0_104 through the debugging control unit 103. Therefore, the debugging control unit 103 can determine whether or not the register information has been rewritten.

When the register information has not been rewritten in the step 703, the process proceeds to a step 705. This is because since the register information has not been rewritten, the register information in the core 0_104 is the same as the register information of the original core to be debugged. Therefore, there is no need to rewritten the register information and debugging can be performed without rewriting the register information.

On the other hand, when the register information of the core 0_104 has been rewritten by the debugger 108 in the step 703, the debugging control unit 103 transfers and thereby returns the register information, which has been rewritten in the core 0_104, to the original core to be debugged (704).

After that, the debugging control unit 103 transfers the register information (the unique data) of the core 0_104 saved in the save area 501 to the core 0_104 (705).

Next, when the core to be debugged is not the core 0_104 in the step 701, the debugging control unit 103 determines whether or not register information in the core 0_104 is unique data of the core 0_104 (706). When the register information in the core 0_104 is the unique data of the core 0_104, the process proceeds to a step 710, whereas when the register information is not the unique data, the process proceeds to a step 707.

When the register information in the core 0_104 is not the unique data of the core 0_104 in the step 706, the debugging control unit 103 determines whether or not the register information of the core 0_104 has been rewritten by the debugger 108 (707).

When the register information has not been rewritten in the step 707, the process proceeds to the step 709. This is because since the register information has not been rewritten, the register information in the core 0_104 is the same as the register information of the original core to be debugged. Therefore, there is no need to rewritten the register information and debugging can be performed without rewriting the register information.

On the other hand, when the register information in the core 0_104 has been rewritten by the debugger 108 in the step 707, the debugging control unit 103 transfers and thereby returns the register information, which has been rewritten in the core 0_104, to the original core to be debugged (708).

After that, the debugging control unit 103 transfers the register information (the unique data) of the core 0_104 saved in the save area 501 to the core 0_104 (709).

When the register information in the core 0_104 is the unique data of the core 0_104 in the step 706, the debugging control unit 103 copies and thereby saves the register information of the core 0_104 in the save area 501 (710). After that, the process proceeds to the step 709.

An example of debugging using the flow shown in FIG. 8 is explained hereinafter. Specifically, in the example, the core 1_105 becomes the core to be debugged and hence unique data of the core 1_105 is read. After that, the core 2_106 becomes the core to be debugged and hence unique data of the core 2_106 is read.

Firstly, in the step 701, since the core to be debugged is the core 1_105, the process proceeds to the step 706. Next, in the step 706, since register information in the core 0_104 is unique data of the core 0_104, the process proceeds to the step 710. Then, in the step 710, the unique data of the core 0_104 is saved in the save area 501.

After that, the process proceeds to the step 709 and unique data of the core 1_105, which is the core to be debugged, is transferred to the core 0_104. In this way, the debugger 108 can read the unique data through the debugging control unit 103 that is connected to the core 0_104 for the unique data of the core 1_105. Further, the number of data transfers so far is two.

After that, the core 2_106 becomes the core to be debugged. Then, in the step 701, since the core to be debugged is the core 2_106, the process proceeds to the step 706. Further, since register information in the core 0_104 is unique data of the core 1_105, the process proceeds to the step 707.

In the step 707, since the unique data of the core 1_105, which is located in the core 0_104, has not been rewritten, the process proceeds to the step 709. Then, in the step 709, unique data of the core 2_106 is transferred to the core 0_104.

In this way, the debugger 108 can read the unique data through the debugging control unit 103 that is connected to the core 0_104 for the unique data of the core 2_106. Further, the number of data transfers that are performed when the core to be debugged is changed from the core 1_105 to the core 2_106 is one.

Figure 9:
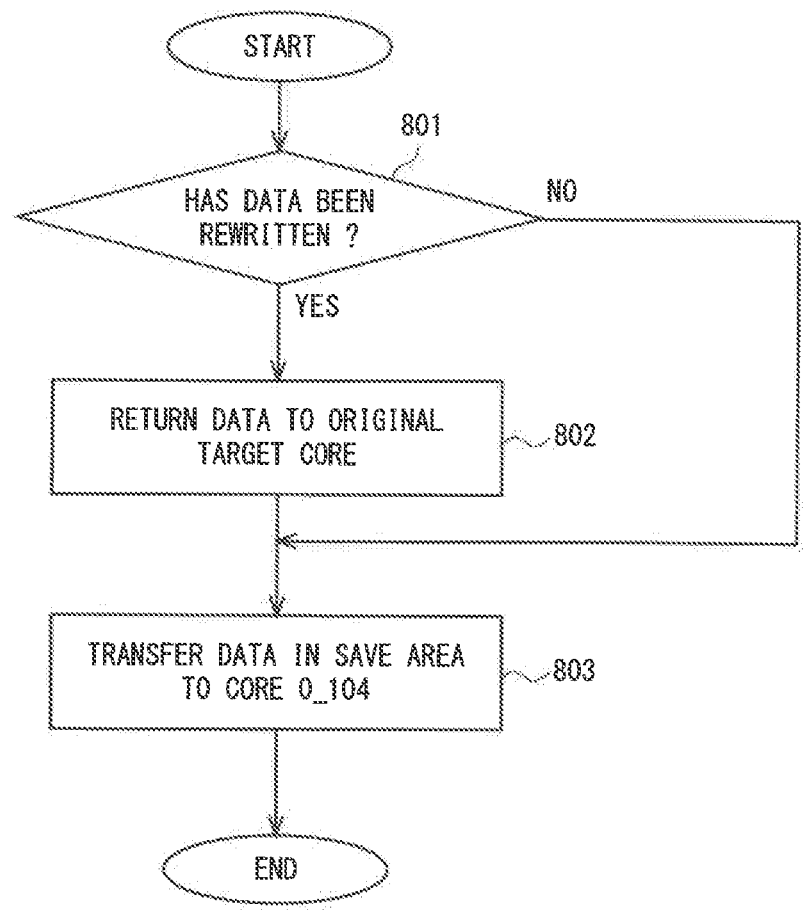
FIG. 9 is a flowchart showing a flow of a process that is performed before the execution of a program is resumed in the multi-processor according to the third embodiment.

In the flow shown in FIG. 8, when the data of the core to be debugged is replaced, the unique data of the core 0_104 is stored only in the save area 501. Therefore, it is necessary to transfer the saved data to the core 0_104 in order to resume the execution of the program. Accordingly, FIG. 9 is a flowchart showing a flow of a process that is performed before the execution of the program is resumed in the processor according to the third embodiment.

Firstly, the debugging control unit 103 determines whether or not register information in the core 0_104 has been rewritten by the debugger 108 (801). When the register information has not been rewritten in the step 801, the process proceeds to a step 803. On the other hand, when the register information in the core 0_104 has been rewritten by the debugger 108 in the step 801, the debugging control unit 103 transfers and thereby returns the register information, which has been rewritten in the core 0_104, to the original core to be debugged (802).

After that, the debugging control unit 103 transfers the register information (the unique data) of the core 0_104 saved in the save area 501 to the core 0_104 (803). In this way, it is possible to restore the unique data of all the cores and hence to resume the execution of the program.

As previously-described, in the second embodiment, three data transfers are always performed in order to replace the unique data of the core to be debugged and the unique data of the core 0_104. In contrast to this, in the third embodiment, when all that has to be done is to refer to and update register information in a core, performing two transfers, i.e., a transfer to the save area 501 and a transfer from from the core to be debugged to the core 0_104 is sufficient. Further, when the core to be debugged is further changed to another core, only one transfer has to be performed when the unique data of the core to be debugged, which is stored in the core 0_104, has not been rewritten. Further, even when the unique data has been rewritten, only two transfers have to be performed.

However, when the execution of the program is resumed, it is necessary to transfer the data from the save area 501 to the core 0_104. Therefore, when the unique data of the core to be debugged, which is stored in the core 0_104, has not been rewritten, one transfer needs to be additionally performed, whereas when the unique data has been rewritten, two transfers need to be additionally performed. That is, when the core to be debugged is changed and the execution of the program is resumed, four data transfers, at the maximum, need to be performed in some cases.

The third embodiment is effective in the case in which data in a plurality of cores are referred to in the state in which the execution of the program is stopped. By reducing the number of data transfers than that in the second embodiment, the speed of the debugging operation can be increased.

<Fourth Embodiment>

A fourth embodiment is a modified example of the above-described first to third embodiments. That is, the fourth embodiment is a multi-processor system including a multi-processor according to one of the first to third embodiments, and a memory including a plurality of save areas each of which corresponds to a respective one of the plurality of cores and is configured to store register information of the respective core. That is, an existing memory is used for the save areas for register information of the cores.

Figure 10:
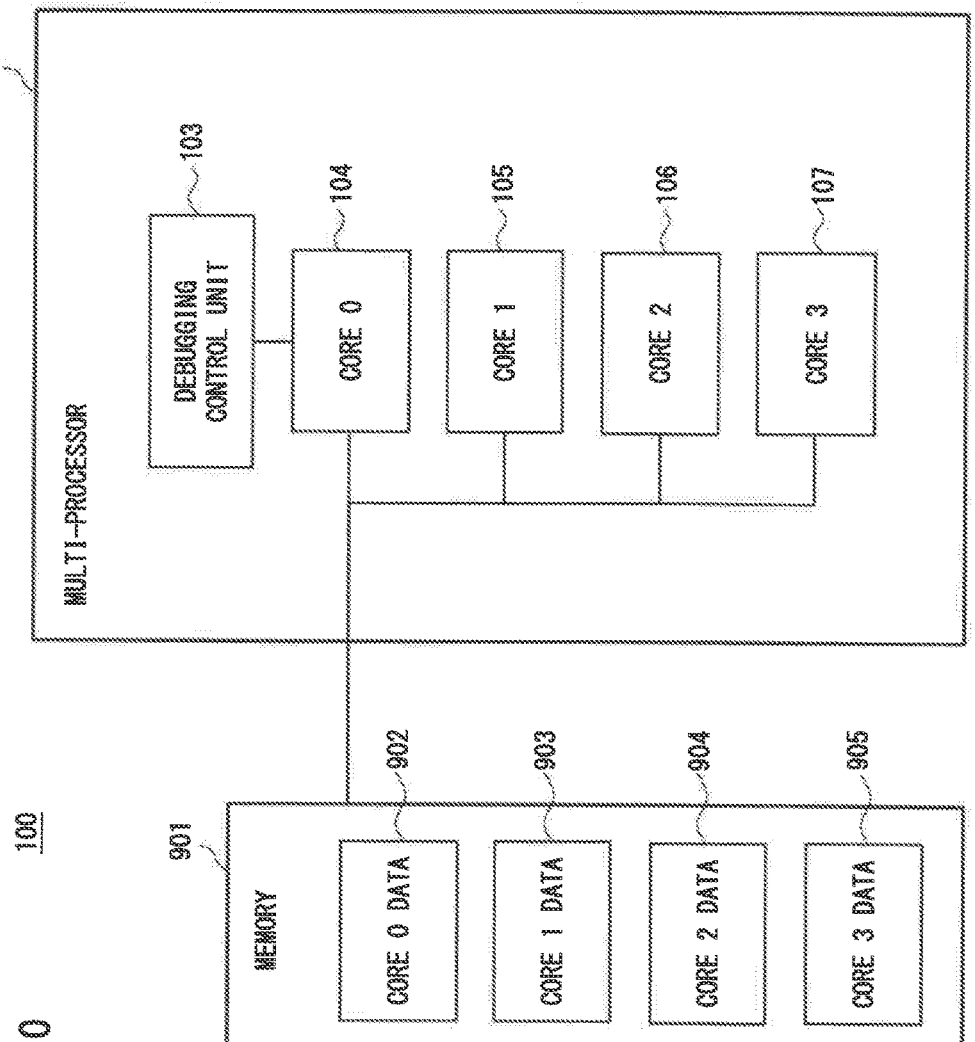
FIG. 10 is a block diagram showing a configuration of a multi-processor system according to a fourth embodiment.

FIG. 10 is a block diagram showing a configuration of a multi-processor system 100 according to the fourth embodiment. The multi-processor system 100 includes a multi-processor 101*b* and a memory 901. The multi-processor 101*b* includes a debugging control unit 103, and cores 0_104, 1_105, 2_106 and 3_107. Each of the cores 0_104 to 3_107 is connected to the memory 901 through a bus.

The memory 901 is a memory device disposed external to the multi-processor 101*b* and stores a program and the like (not shown). Further, the memory 901 stores core 0 data 902, core 1 data 903, core 2 data 904, and core 3 data 905. The core 0 data 902 is a copy of register information of the core 0_104. Similarly, the core 1 data 903 is a copy of register information of the core 1_105 and the core 2 data 904 is a copy of register information of the core 2_106. Further, the core 3 data 905 is a copy of register information of the core 3_107.

The debugging control unit 103 instructs each core to save its register information in the memory 901 at the time of debugging. In this way, the debugging control unit 103 can refer to and update the core 0 data 902 to core 3 data 905 in the memory 901 through the core 0_104.

<Other Embodiments>

Further, although the present disclosure is explained as a hardware configuration in the above-described embodiments, the present disclosure is not limited to the hardware configuration. The present disclosure can be implemented by implementing an arbitrary process by having a processor such as a CPU (Central Processing Unit) execute a computer program.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The present disclosure made by the inventors of the present application has been explained above in a concrete manner based on embodiments. However, the present disclosure is not limited to the above-described embodiments, and needless to say, various modifications can be made without departing from the spirit and scope of the present disclosure.

The first, second, third and fourth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A multi-processor comprising:
a first core which includes a first register;
a second core which is coupled to the first core and including a second register; and
a debugging control circuit which is coupled to the first core, and which controls debugging processes of a first program and a second program executed in the first core and the second core in response to instructions from a debugger, wherein
the first core executes the first program to store first information according to the first program in the first register,
the second core executes the second program to store second information according to the second program in the second register, the first program and the second program are executed in parallel, after the first program and the second program are executed in parallel, the debugging control circuit refers to and updates the first information stored in the first register in response to an instruction from the debugger, the debugging control circuit transfers the second information stored in the second register to the first register when the debugging control circuit receives a debugging target change instruction from the debugger, and the first core executes the second program by using the second information transferred from the second core.

2. The multi-processor according to claim 1, further comprising a third core which is coupled to the first core and the second core, and which includes a third register wherein the third core executes the third program to store third information according to the third program in the third register, the first program, the second program, and the third program are executed in parallel, and after the first program, the second program, and the third program are executed in parallel, when the debugging control circuit receives a debugging target change instruction from the debugger, the debugging control circuit transfers the second information stored in the second register to the first register and transfers the first information stored in the first register to the third register.

3. The multi-processor according to claim 1, wherein register information includes a value of at least one of a program counter or a status register.

4. The multi-processor according to claim 1, further comprising a save area which is coupled to the first core, wherein when the second information stored in the second register is transferred to the first register, the debugging control circuit transfers the first information stored in the first register to the save area.

5. The multi-processor according to claim 1, further comprising a breakpoint storage part which stores a first breakpoint set for an instruction included in the first program and a second breakpoint set for an instruction included in the second program, wherein the first program and the second program are executed in parallel until the first core executes the instruction of the first program for the first breakpoint set.

6. The multi-processor according to claim 1, further comprising a memory including a save area in which register information from the first and second registers, which is core unique data, is stored.

7. The multi-processor according to claim 1, wherein the first core, second core, and debugging control circuit being formed on a chip separate from a debugging system comprising the debugger running a debugger program to debug the first and second cores.

8. A multi-processor comprising:
a plurality or cores;
a debugging control circuit; and
a save area, wherein
at least one of the plurality of cores is a debugging core, the debugging core being connected to the debugging control circuit so that the debugging control circuit refers to and updates register information in the debugging core, and the debugging control circuit transfers register information in a first core to the debugging core, the first core being one of the plurality of cores and being a core to be debugged, the debugging control circuit transfers the register information in the first core to the debugging core after transferring the register information in the debugging core to the save area.

9. The multi-processor according to claim 8, wherein when the core to be debugged is changed to a second core among the plurality of cores, the debugging control circuit transfers the register information in the debugging core to the first core, and the debugging control circuit transfers register information in the second core to the debugging core.

10. The multi-processor according to claim 9, wherein when the core to be debugged is changed to the second core, the debugging control circuit determines whether or not the register information in the debugging core has been rewritten, and when the debugging control circuit determines that the register information in the debugging core has been rewritten, the debugging control circuit transfers the rewritten register information to the first core.

11. The multi-processor according to claim 8, wherein the debugging core debugs a program by using the transferred register information.

12. The multi-processor according to claim 8, further comprising a memory including the save area in which register information, which is data unique to a core, is stored.

13. The multi-processor according to claim 8, wherein when the debugging control circuit determines that register information is not unique data of a core to be debugged, the debugging core instructs each of the plurality of cores to transfer its unique data to a neighboring core.

14. The multi-processor according to claim 8, wherein when a core to be debugged is changed from among the plurality of cores, unique data of the core to be debugged is transferred to another one of the plurality of cores to debug a part of a program running on a core that is not connected to the debugging control circuit.

15. A multi-processor system comprising:
a multi-processor according to claim 1, and
a memory comprising a plurality of save areas, each of the save areas corresponding to a respective one of the plurality of cores and being configured to store register information of the respective core.

16. A multi-processor comprising:
a plurality of cores;
a debugging controller; and
a memory including a save area, wherein
at least one of the plurality of cores is a debugging core, the debugging core being connected to the debugging controller such that the debugging controller refers to and updates register information in the debugging core, and the debugging controller transfers register information in a first core to the debugging core, the first core being one of the plurality of cores and being a core to be debugged, the debugging controller transfers the register information in the first core to the debugging core after transferring the register information in the debugging core to the save area.

17. The multi-processor according to claim 16, wherein when the core to be debugged is changed to a second core among the plurality of cores, the debugging controller transfers the register information in the debugging core to the first core.

18. The multi-processor according to claim 17, wherein the debugging controller transfers register information in the second core to the debugging core.

19. The multi-processor according to claim 17, wherein when the core to be debugged is changed to the second core, the debugging controller determines whether or not the register information in the debugging core has been rewritten.

20. The multi-processor according to claim 19, wherein when the debugging controller determines that the register information in the debugging core has been rewritten, the debugging controller transfers the rewritten register information to the first core.

* * * * *